US012776205B2

(12) United States Patent
Saxena

(10) Patent No.: US 12,776,205 B2
(45) Date of Patent: Oct. 27, 2026

(54) VEHICLE MONITORING SYSTEM

(71) Applicant: Transportation IP Holdings, LLC, Norwalk, CT (US)

(72) Inventor: Amit Saxena, Marion, IA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 175 days.

(21) Appl. No.: 18/325,721

(22) Filed: May 30, 2023

(65) Prior Publication Data

US 2024/0071214 A1 Feb. 29, 2024

Related U.S. Application Data

(60) Provisional application No. 63/401,088, filed on Aug. 25, 2022.

(51) Int. Cl.

*G08G 1/01* (2006.01)
*B61L 15/00* (2006.01)
*G08G 1/052* (2006.01)

(52) U.S. Cl.

CPC ........ *G08G 1/0145* (2013.01); *B61L 15/0054* (2013.01); *G08G 1/0108* (2013.01); *G08G 1/052* (2013.01)

(58) Field of Classification Search

CPC .... G08G 1/0145; G08G 1/0108; G08G 1/052; B61L 15/0054

See application file for complete search history.

(56) References Cited

U.S. PATENT DOCUMENTS 4,807,127 A * 2/1989 Tenmoku ............... G01C 21/30 701/445
5,969,643 A * 10/1999 Curtis ................. B61L 15/0072 340/988
6,081,769 A * 6/2000 Curtis ................. B61L 15/0027 702/158
6,311,109 B1 * 10/2001 Hawthorne ........... B61L 23/047 701/19
6,915,191 B2 * 7/2005 Kane ..................... B61L 25/025 701/19
7,925,433 B2 * 4/2011 Smith .................. G07C 5/0858 340/991

(Continued)

FOREIGN PATENT DOCUMENTS

JP H07294622 A * 11/1995 ............... G01S 5/14

OTHER PUBLICATIONS

Translation of JP H07294622 A, 10 pages (Year: 1995).*
Office Action in corresponding Canada Application No. 3203001 dated Feb. 20, 2026.

*Primary Examiner* — Dale W Hilgendorf
(74) *Attorney, Agent, or Firm* — K&L Gates LLP

(57) ABSTRACT

A system and method are provided that monitor a first location of a first position in a moving vehicle system, determine that the first location of the first position in the moving vehicle system has reached a designated location, calculate an initial location of a second position in the moving vehicle system responsive to the first location of the first position in the moving vehicle system reaching the designated location, and track movement of the second position in the moving vehicle system toward the designated location based on the initial location that is calculated and a moving speed of the vehicle system.

18 Claims, 9 Drawing Sheets

(56) References Cited

U.S. PATENT DOCUMENTS

| | | | | |
|---|---|---|---|---|
| 8,190,312 | B2 * | 5/2012 | Nandedkar | B61L 25/021 701/19 |
| 10,759,456 | B2 * | 9/2020 | Mathews | G01S 19/47 |
| 10,859,714 | B2 * | 12/2020 | Craven | G01S 19/14 |
| 2004/0236482 | A1 * | 11/2004 | Kane | B61L 25/021 701/19 |
| 2005/0090981 | A1 * | 4/2005 | Gaegauf | B61L 27/04 701/1 |
| 2006/0290478 | A1 * | 12/2006 | Stull | B61L 25/023 340/425.5 |
| 2014/0277859 | A1 * | 9/2014 | Morris | B61L 15/0054 701/19 |
| 2017/0043797 | A1 * | 2/2017 | Allshouse | B61L 25/025 |
| 2017/0263120 | A1 * | 9/2017 | Durie, Jr. | G08G 1/205 |
| 2018/0327010 | A1 * | 11/2018 | Kernwein | B61L 1/14 |
| 2020/0189630 | A1 * | 6/2020 | Kernwein | B61L 15/0054 |
| 2020/0207387 | A1 * | 7/2020 | Abrosimov | B61L 15/0063 |
| 2020/0262300 | A1 * | 8/2020 | Tokumaru | B61L 23/34 |
| 2022/0185350 | A1 * | 6/2022 | Kindt | B61L 1/18 |
| 2022/0299336 | A1 * | 9/2022 | Oswald | B61L 25/025 |
| 2022/0315072 | A1 * | 10/2022 | Zhang | B61L 25/025 |
| 2022/0379936 | A1 * | 12/2022 | Piparsaniya | B61L 15/0063 |
| 2023/0146176 | A1 * | 5/2023 | Kirchner | G07C 5/02 701/23 |
| 2023/0339526 | A1 * | 10/2023 | Kernwein | B61L 29/24 |
| 2024/0028046 | A1 * | 1/2024 | Vrba | G05D 1/027 |
| 2024/0067242 | A1 * | 2/2024 | Piparsaniya | B61L 15/0018 |

* cited by examiner

VEHICLE MONITORING SYSTEM

CROSS-REFERENCE TO RELATED APPLICATIONS

This application claims priority to U.S. Provisional Application No. 63/401,088 (filed 25 Aug. 2022), the entire content of which is incorporated herein by reference.

BACKGROUND

Technical Field

The subject matter described herein relates to systems and methods that monitor locations and movements of vehicles in a network of routes to communicate with the vehicles for safe movement and operation of the vehicles within the network of routes.

Discussion of Art

Some known vehicle monitoring systems communicate with vehicles to monitor the locations and movements of the vehicles. These systems can then communicate signals to the vehicle to inform the vehicles of where the vehicles are permitted to travel, where the vehicles are not permitted to travel, and/or how fast the vehicles can travel in various segments of the routes in the network. Examples of these types of systems can include a positive vehicle monitoring system, such as a Positive Train Control (PTC) system. This type of system can send signals to the vehicles to inform the vehicles of which segments the vehicles can enter and/or how the vehicles can move within the segments. Absent receiving such a signal, components of the positive vehicle monitoring system that are onboard the vehicles can autonomously control the vehicles to prevent the vehicles from entering segments that the vehicles are not permitted to enter and/or to prevent the vehicles from moving in ways that are not permitted (e.g., moving faster than a speed limit associated with a maintenance crew on the route, damage to the route, etc.). Another example of such a system can include a negative vehicle monitoring system, which issues signals to notify the vehicles of route segments that the vehicles are not permitted to enter. Absent receiving such a signal, the onboard components of the control system may allow the vehicles to enter the route segments.

The vehicles may be mechanically coupled with each other to travel as a multi-vehicle system, such as a train formed from one or more propulsion-generating vehicles (e.g., locomotives) and/or one or more non-propulsion-generating vehicles (e.g., rail cars). The monitoring systems may need to know the portions of the routes that are occupied by the vehicle systems within the network. This can be partially accomplished by the monitoring systems receiving locations reported by the vehicle systems, such as the locations determined by global navigation satellite system (GNSS) receivers (e.g., global positioning system (GPS) receivers) onboard the vehicle systems. These receivers tend to be in one place in the vehicle systems, such as the leading end or vehicle in the vehicle system.

Each monitoring system may monitor vehicles moving within a defined geographic area with one or more routes in the area extending out of the geographic area, and potentially into another geographic area that is monitored by another monitoring system. One problem with current monitoring systems is that once the location-reporting device in the vehicle system reaches the edge or boundary of the monitored geographic area, the monitoring system may lose track of the rest of the vehicle system that is still within the monitored geographic area. This can pose a safety risk for other vehicles or vehicle systems, as the remaining length of the vehicle system that remains in the monitored geographic area is no longer monitored by the monitoring system.

It may be desirable to have a system and method that differs from those that are currently available.

BRIEF DESCRIPTION

In one example, a method is provided that includes monitoring a first location of a first position in a moving vehicle system, determining that the first location of the first position in the moving vehicle system has reached a designated location, calculating an initial location of a second position in the moving vehicle system responsive to the first location of the first position in the moving vehicle system reaching the designated location, and tracking movement of the second position in the moving vehicle system toward the designated location based on the initial location that is calculated and a moving speed of the vehicle system.

In another example, a system is provided that includes a controller that may monitor a first location of a first position in a moving vehicle system and may determine that the first location of the first position in the moving vehicle system has reached a designated location and to calculate an initial location of a second position in the moving vehicle system responsive to the first location of the first position in the moving vehicle system reaching the designated location. The controller may track movement of the second position in the moving vehicle system toward the designated location based on the initial location that is calculated and a moving speed of the vehicle system.

In another example, a vehicle coordination system may include a controller disposed off-board a first vehicle system that may track movements of the first vehicle system and one or more other second vehicle systems within a network of interconnected routes. The controller may generate movement authorities to remotely restrict movements of the first and second vehicle systems based on the movements of the first and second vehicle systems. The controller may receive movements of a trailing end of the first vehicle system that is based on dead reckoning calculations of the trailing end initiated responsive to a leading end of the first vehicle system reaching a boundary of a mapped area.

BRIEF DESCRIPTION OF THE DRAWINGS

The subject matter may be understood from reading the following description of non-limiting embodiments, with reference to the attached drawings, wherein below.

DETAILED DESCRIPTION

Embodiments of the subject matter described herein relate to monitoring systems and methods that can continue monitoring the portions of routes occupied by vehicle systems that exit out of the geographic areas monitored by the systems and methods. This can allow for the systems and methods to continue to have knowledge of the remaining length of a vehicle system that is in the monitored geographic area even when a front or leading end of the vehicle system exits the area. While one or more embodiments of the subject matter are described in connection with rail vehicles and multi-vehicle systems, not all embodiments of the inventive subject matter are limited to rail vehicles or multi-vehicle systems. One or more embodiments may related to non-rail vehicles (e.g., automobiles, trucks, buses, agricultural vehicles, marine vessels, mining vehicles, or the like) and/or single vehicle systems. Unless expressly disclaimed or stated otherwise, the subject matter described herein extends to other types of vehicle systems, such as automobiles, trucks (with or without trailers), buses, marine vessels, mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

Figure 1:
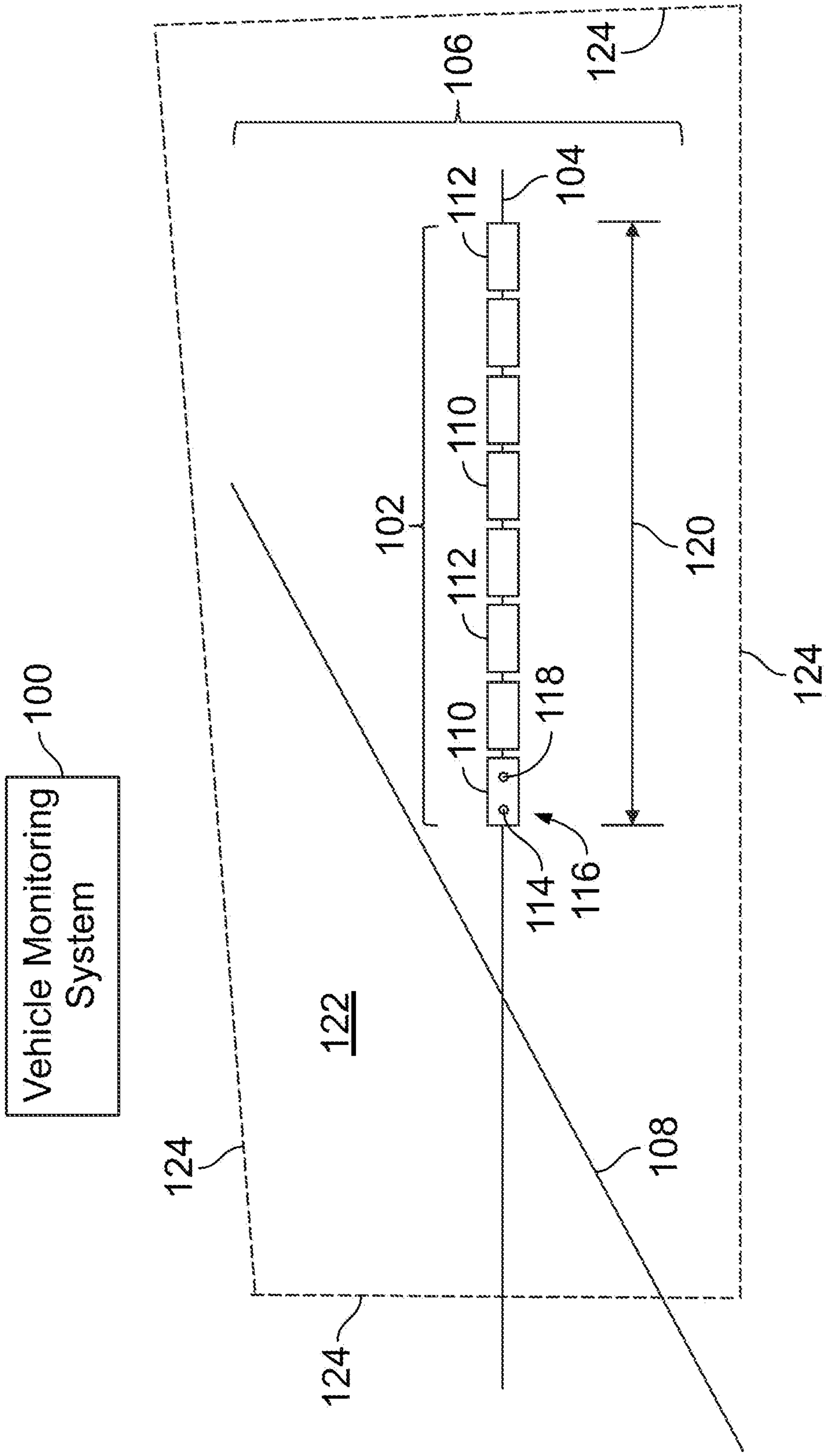
FIG. 1 illustrates one example of a vehicle monitoring system and a multi-vehicle system traveling on a route within a network of interconnected routes.
Figure 2:
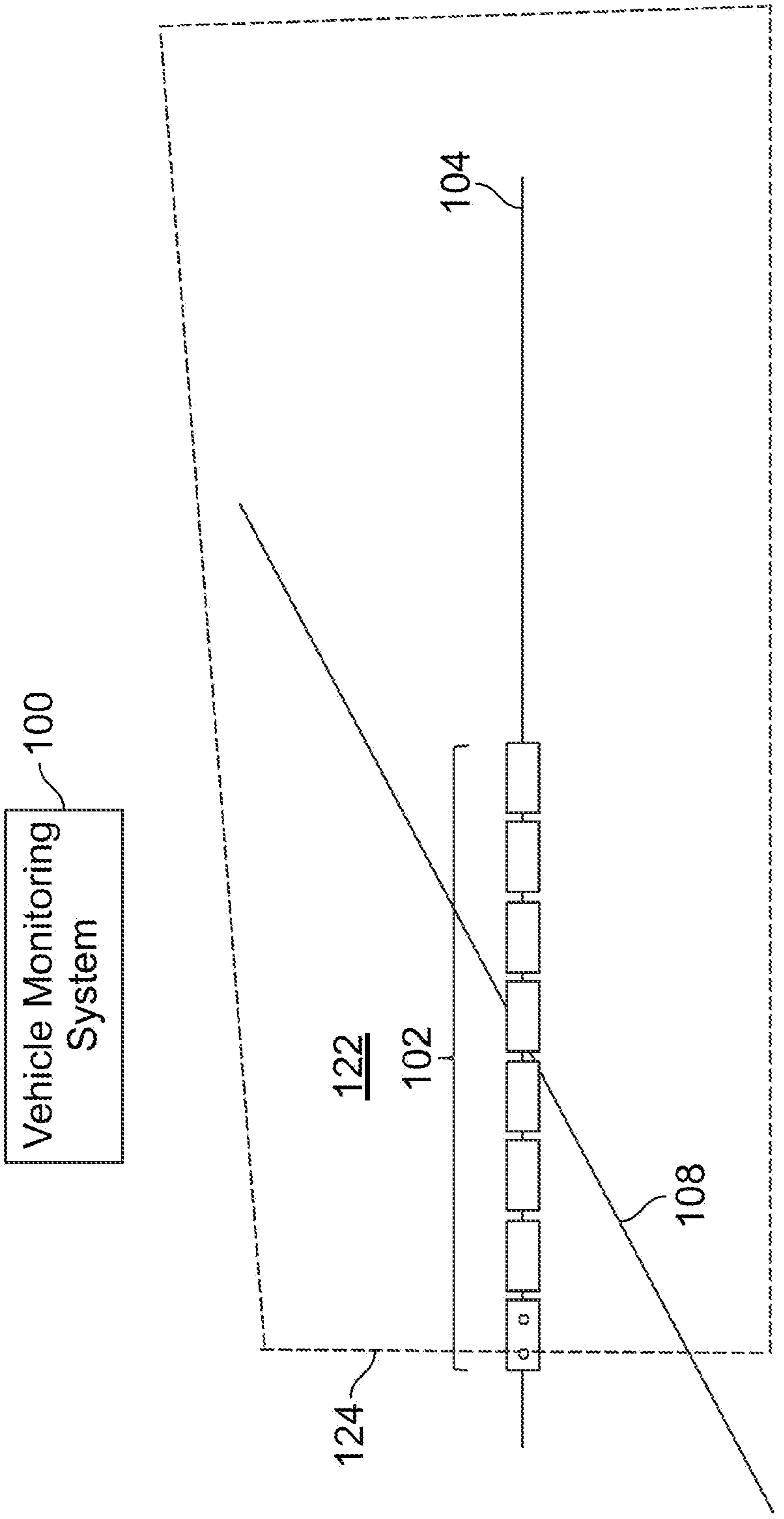
FIG. 2 illustrates another example of the vehicle monitoring system and the multi-vehicle system traveling on the route shown in FIG. 1.
Figure 3:
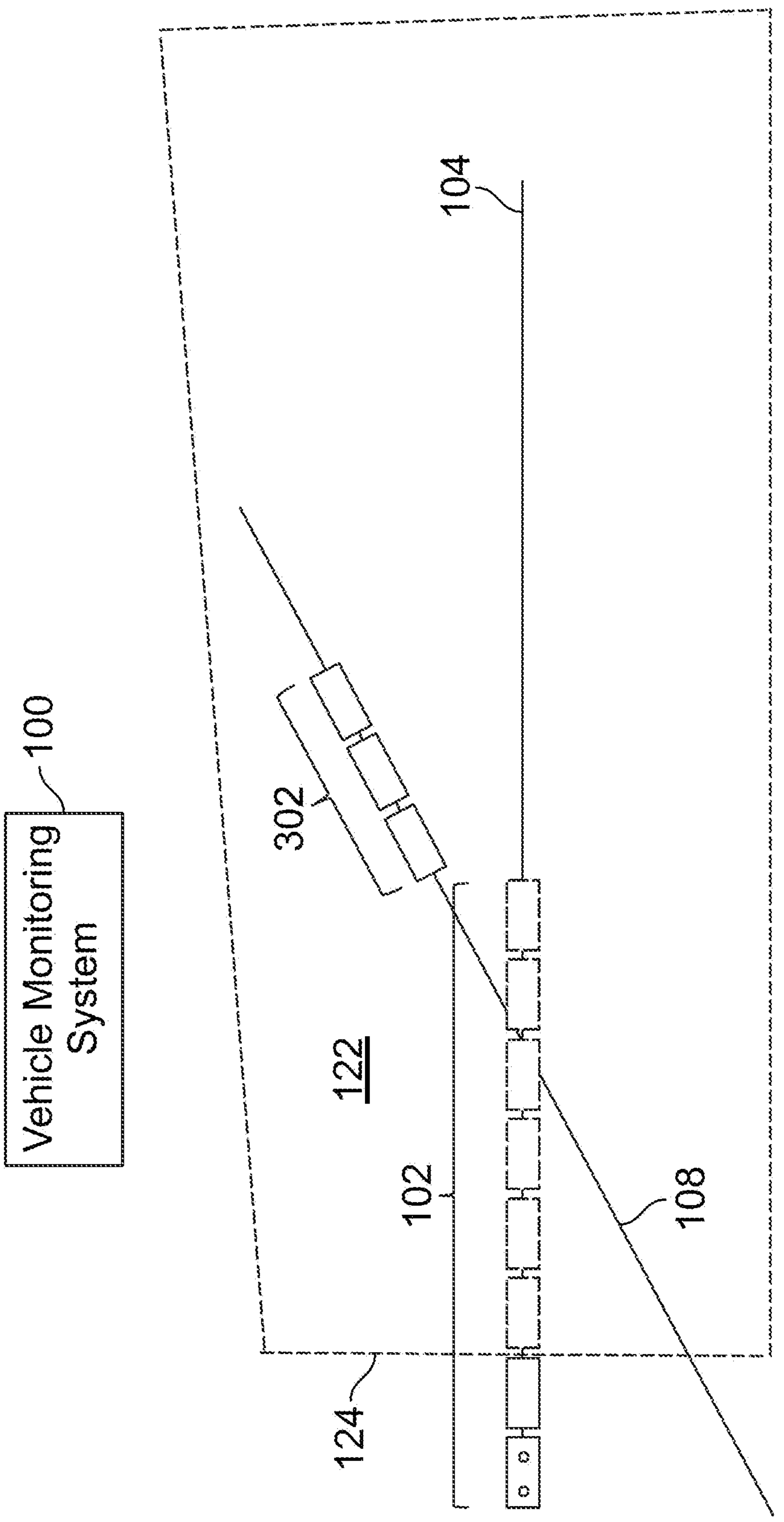
FIG. 3 illustrates another example of the vehicle monitoring system and the multi-vehicle system traveling on the route shown in FIGS. 1 and 2.

FIGS. 1 through 3 illustrate one example of a vehicle monitoring system 100 and a multi-vehicle system 102 traveling on a route 104 within a network 106 of interconnected routes 104, 108. The vehicle system may be formed from several propulsion-generating vehicles 110 (e.g., locomotives, automobiles, etc.) and optionally one or more non-propulsion-generating vehicles 112 (e.g., rail cars, trailers, etc.). The vehicle system can include a location sensor 114 onboard a vehicle. The location sensor can represent a GNSS receiver, such as a GPS receiver. In the illustrated embodiment, the location sensor is onboard a leading vehicle at a leading end 116 of the vehicle system. In one embodiment, the vehicle system may not have a location sensor at another position within the vehicle system, such as at or near a trailing end of the vehicle system. The location sensor can output data to a controller 118 onboard the vehicle system, such as onboard the same leading vehicle or onboard another vehicle. This data can represent the geographic location of the location sensor, and the controller can communicate or direct communication of the geographic location(s) to the monitoring system.

As shown in FIG. 1, the vehicle system can occupy a length 120 of a route. This occupied length may change in location along the route as the vehicle system moves, but the length may stay approximately equal due to the number of vehicles remaining constant and the vehicles moving together (with variances in the length changing due to changes in length of the couplers between the vehicles, due to differentials or changes in speeds between neighboring vehicles, etc.). The monitoring system may monitor some, but less than all, of the total lengths of the routes. For example, the monitoring system may monitor movements of several vehicle systems on routes that are within a geographic area 122 bounded or framed by geographic boundaries 124. The boundaries may extend around, encircle, or otherwise define outer limits to the area in which movements of the vehicle systems are monitored.

As described above, in some known monitoring systems, once the location sensor onboard the vehicle system reaches or crosses over the boundary of a monitored area (as shown in FIG. 2, also referred to as a mapped area), the locations reported back to the monitoring system are outside of the area monitored by the monitoring system. As a result, the monitoring system may become unaware of how much of the route 104 is currently occupied by the vehicle system. This can cause the monitoring system to be unaware of what length of the route 104 is currently occupied by the vehicle system (as shown by the broken lines in FIG. 3 used to indicate the unknown locations of the vehicles in the vehicle system). If another vehicle system 302 is traveling on the same route 104 or another route 108 that intersects the route 104 (as shown in FIG. 3), there may be an increased risk of collision between the vehicle systems that the monitoring system may be unable to prevent.

Figure 4:
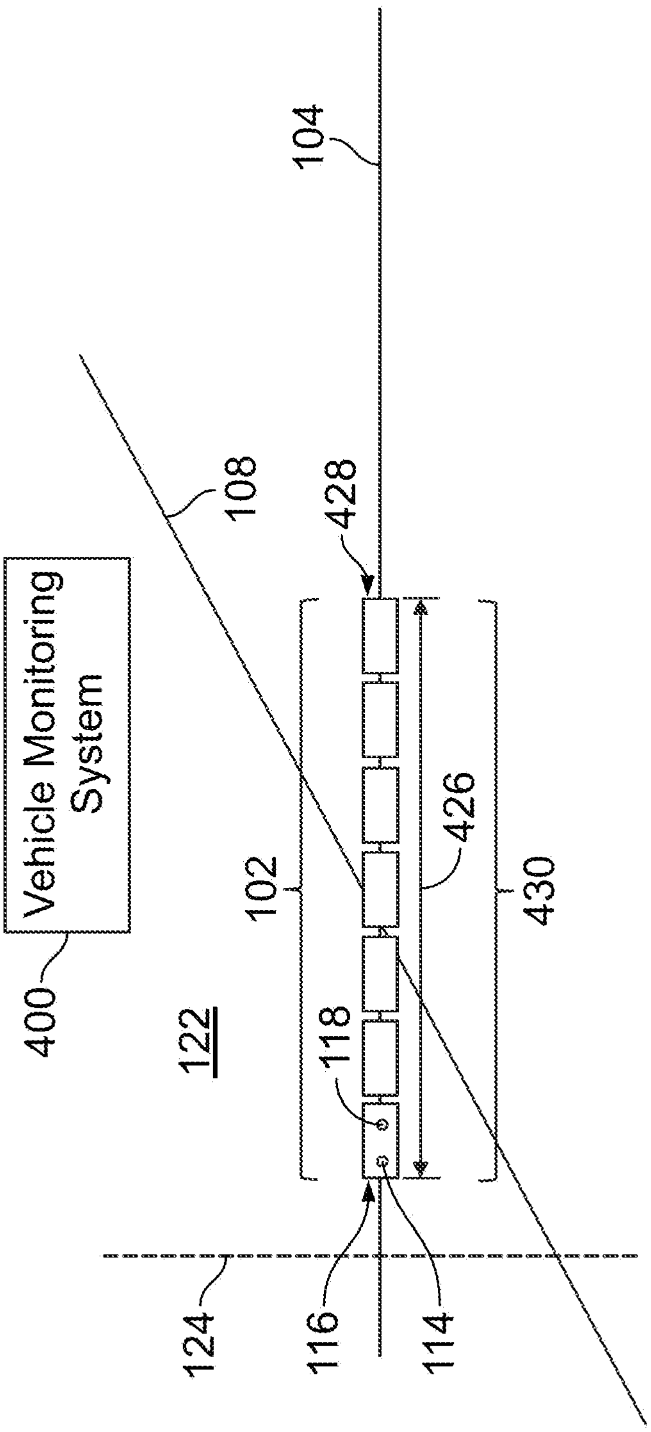
FIG. 4 illustrates another example of a vehicle monitoring system and a multi-vehicle system traveling on a route within a network of interconnected routes.
Figure 5:
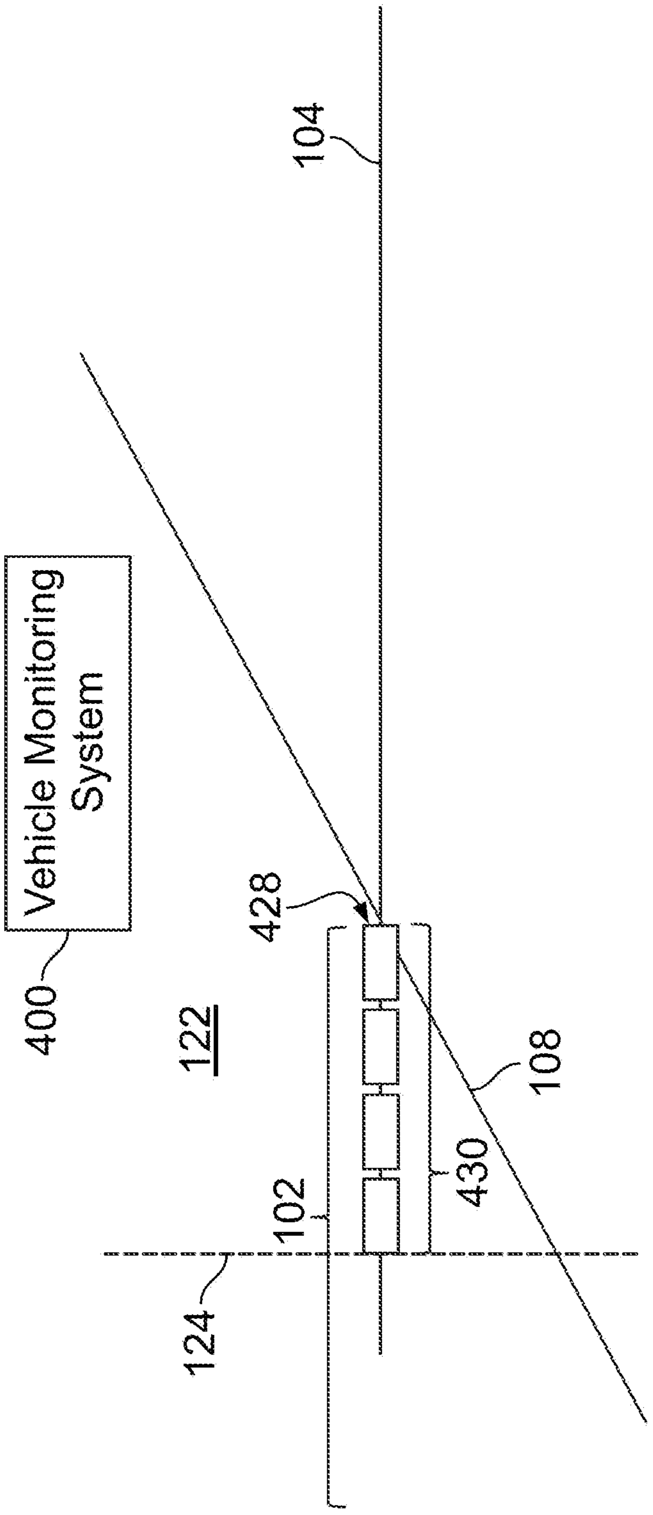
FIG. 5 illustrates another example of the vehicle monitoring system and the multi-vehicle system traveling on the route shown in FIG. 4.
Figure 6:
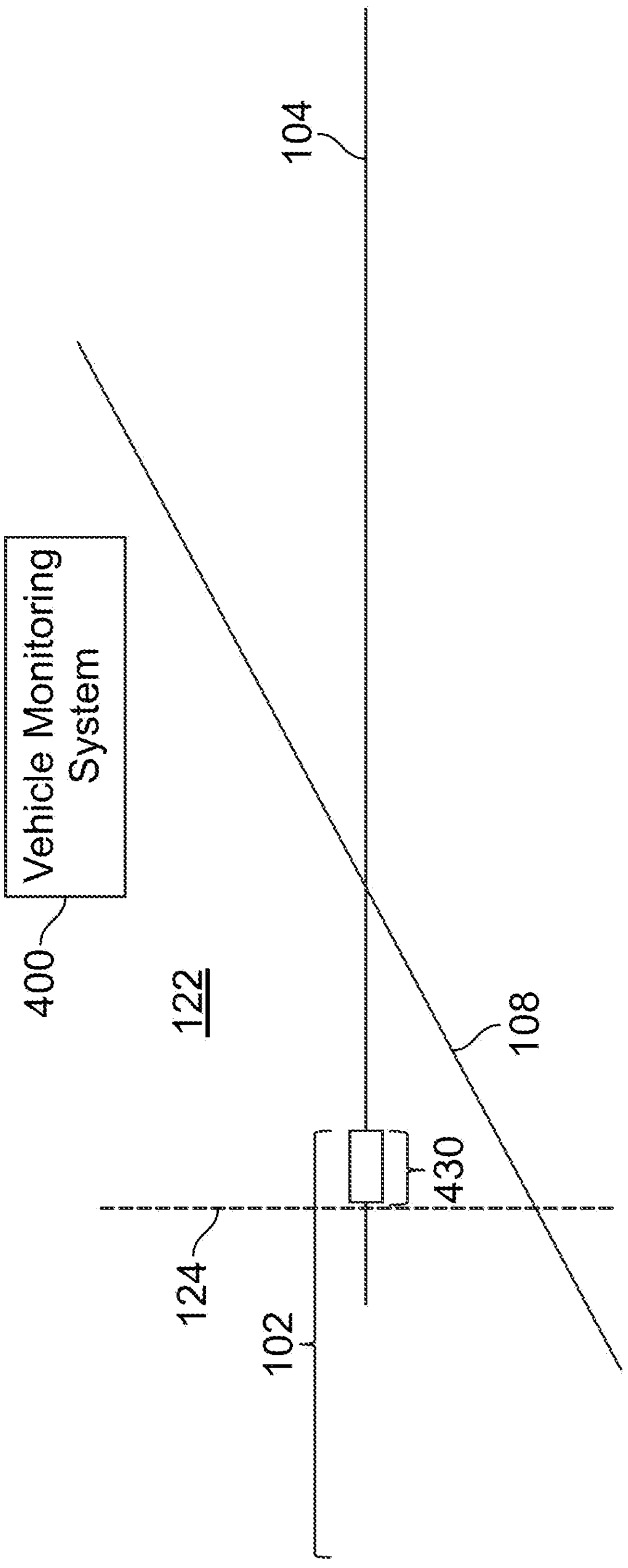
FIG. 6 illustrates another example of the vehicle monitoring system and the multi-vehicle system traveling on the route shown in FIGS. 4 and 5.

To prevent or reduce this risk of collision, one embodiment of the inventive subject matter calculates locations and movements of a remainder of the vehicle system that remains in the monitored geographic area after the portion of the vehicle system having the location sensor leaves the monitored area. FIGS. 4 through 6 illustrate another example of a vehicle monitoring system 400 and the vehicle system 102 traveling on the route within the network of routes. Only one of the boundaries of the monitored area is shown in FIGS. 4 through 6.

The controller onboard the vehicle system may know, receive, or determine a total length 426 of the vehicle system. This length can represent the distance between the leading end of the vehicle system (e.g., the forward or leading end of the vehicle system along a direction of movement) and an opposite trailing end 428 of the vehicle system along the linear and/or non-linear path of the route on which the vehicle system is disposed. This length can be input by or derived from an operator, a manifest, or another source, or can be a default length. The length of the vehicle system may be based on (e.g., may be a sum of) the lengths of individual vehicles in the vehicle system, the number of the vehicles in the vehicle system, the distance between and/or lengths of the couplers between the vehicles in the vehicle system, and/or the like.

The vehicle system controller can monitor the geographic location (and changes to this location) in a position in the vehicle system as the vehicle system is moving along the route. This position can be the position of the location sensor onboard the vehicle system. In the illustrated embodiment, the position can be onboard the vehicle at the leading end of the vehicle system. Optionally, the position that is monitored can be in another vehicle of the vehicle system. The controller may know or determine the location of the boundary or boundaries of the monitored area (e.g., from operator input, from a computer memory, or the like).

Responsive to the monitored location of the position in the vehicle system (e.g., the location of the location sensor) reaching or coming within a threshold distance of a designated location (e.g., the boundary of the monitored area or an intersection between the route on which the vehicle system is moving and the monitored area boundary), the vehicle system controller can calculate an initial location of a second position in the vehicle system. This second position can be the trailing end or edge of the vehicle system. Alternatively, the second position can be another location or position of the vehicle system. For example, the vehicle system controller can calculate the position of the trailing end of the vehicle system by calculating the distance between the designated location (e.g., the monitored area boundary) and the trailing end of the vehicle system along the path (linear and/or non-linear path) of the route on which the vehicle system is moving. This distance can be the length of the vehicle system from the leading end to the opposite trailing end of the vehicle system.

The vehicle system controller can then monitor movement of the second position (e.g., the trailing end) of the vehicle system as the vehicle system continues to move toward and across the boundary of the monitored area. For example, the vehicle system controller can monitor a moving speed of the vehicle system. This moving speed may be determined from output from the location sensor or another sensor, such as a tachometer, rotational sensor, etc., of the vehicle system. The vehicle system controller vehicle system controller can track the location of the second position of the vehicle system along the path of the route toward the boundary using this moving speed. For example, the initial location of the trailing end of the vehicle system may be tracked or calculated as moving along the route toward the boundary at a rate that is the same as or otherwise matches the moving speed of the vehicle system along the route. In one embodiment, the controller uses dead reckoning calculations to track movement of the trailing end of the vehicle system toward the boundary along the route.

The vehicle system controller can communicate changes in the location of the second position in the vehicle system to the monitoring system. For example, the controller can wirelessly communicate the changing locations of the trailing end of the vehicle system along the route toward the boundary to the monitoring system. As shown in FIGS. 4, 5, and 6, the trailing edge moves closer and closer to the boundary as the vehicle system crosses the boundary.

The monitoring system can use the changing locations of the trailing end of the vehicle system to manage movement of one or more other vehicle systems. For example, the monitoring system can determine that an occupied length or segment 430 of the route changes in location and/or size as the vehicle system moves along the route. In FIG. 4, the occupied length of the route is the same or approximately the same as the length of the vehicle system, and the occupied length of the route and the length of the vehicle system may be coextensive (e.g., extend over the same portion of the route).

In FIG. 5, however, a portion of the vehicle system has crossed the boundary of the monitored area while a remainder of the vehicle system is still within the monitored area. Therefore, the occupied length of the route is shorter than the total length of the vehicle system. The portion of the vehicle system that is no longer within the monitored area is not visible in FIG. 5 as the monitoring system may no longer monitor the movement of the portion of the vehicle system that is outside of the monitored area (as another monitoring system may be monitoring movement of that portion of the vehicle system that is in another monitored area).

In FIG. 6, a larger portion of the vehicle system has crossed the boundary of the monitored area while a smaller remainder of the vehicle system is still within the monitored area. Therefore, the occupied length of the route is shorter than the total length of the vehicle system and is shorter than the prior occupied length of the route. The portion of the vehicle system that is no longer within the monitored area is not visible in FIG. 6 as the monitoring system may no longer monitor the movement of the portion of the vehicle system that is outside of the monitored area.

In this way, the monitored portion of the vehicle system (e.g., the length of the vehicle system that occupies part of the route in the monitored area) continues to shrink or get smaller until the vehicle system completely leaves the monitored area. The monitoring system can treat the shrinking portion of the route that is occupied as unavailable to other vehicle systems and can send signals to prevent other vehicle systems and/or vehicles from entering the shrinking portion of the occupied part of the route. This can permit the monitoring system to continue coordinating movements of the vehicle systems and/or vehicles as one vehicle system leaves the monitored area. For example, the monitoring system may create and issue (e.g., communicate) movement authorities to other vehicle systems, where the movement authorities indicate the shrinking size of the occupied portion of the route. These movement authorities may be communicated to the other vehicle systems to prevent these vehicle systems from entering the same portion of the route that is occupied by the vehicle system leaving the monitored area.

Figure 7:
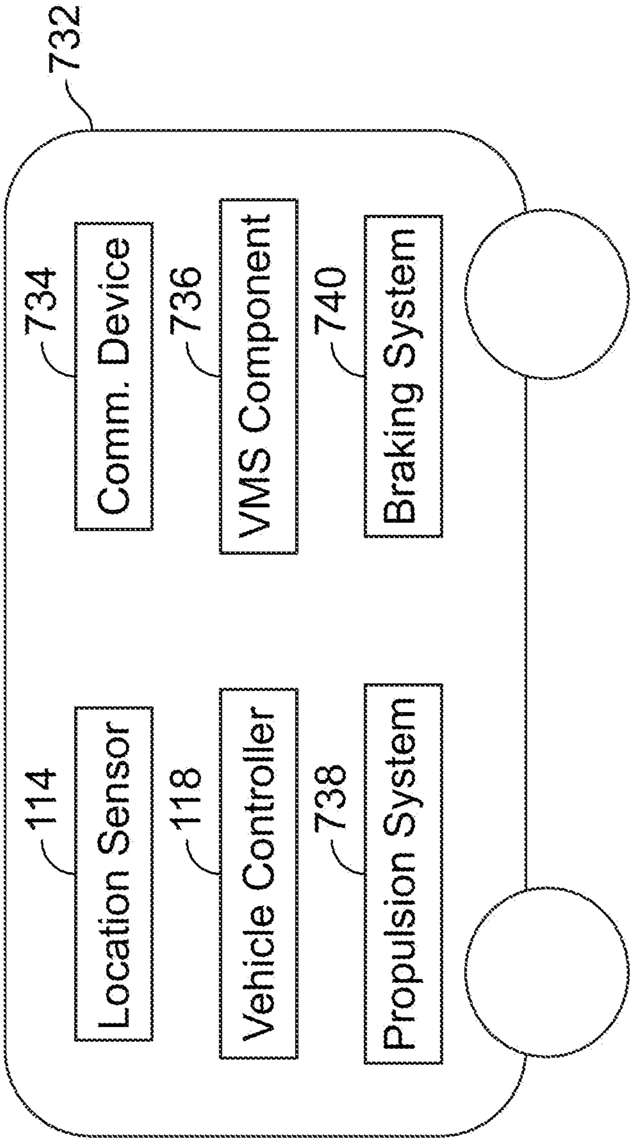
FIG. 7 illustrates one example of a vehicle.

FIG. 7 illustrates one example of a vehicle 732. The vehicle may represent one or more of the vehicles in the vehicle system shown and described herein. The vehicle includes the location sensor 114 and the controller 118 ("Vehicle Controller" in FIG. 7) described above. The vehicle also includes a communication device 734 that communicates with the monitoring system described herein. The communication device can represent transceiving circuitry, such as one or more modems, antennas, transceivers, or the like. The vehicle also may include a vehicle monitoring system component 736 ("VMS Component" in FIG. 7). This component represents the onboard component of the monitoring system. For example, the onboard component may receive signals (e.g., movement authorities) from the monitoring system via the communication device. The onboard component can include hardware circuitry that includes and/or is connected with one or more processors that perform the operations described in connection with the onboard component. The onboard component can automatically control a propulsion system 738 (e.g., one or more motors, engines, batteries, fuel cells, or the like, that operate to propel the vehicle) and/or a braking system 740 (e.g., one or more friction brakes, air brakes, motors capable of dynamically braking, etc.) to ensure that the vehicle moves according to the movement authorities or other signals sent from the monitoring system.

Figure 8:
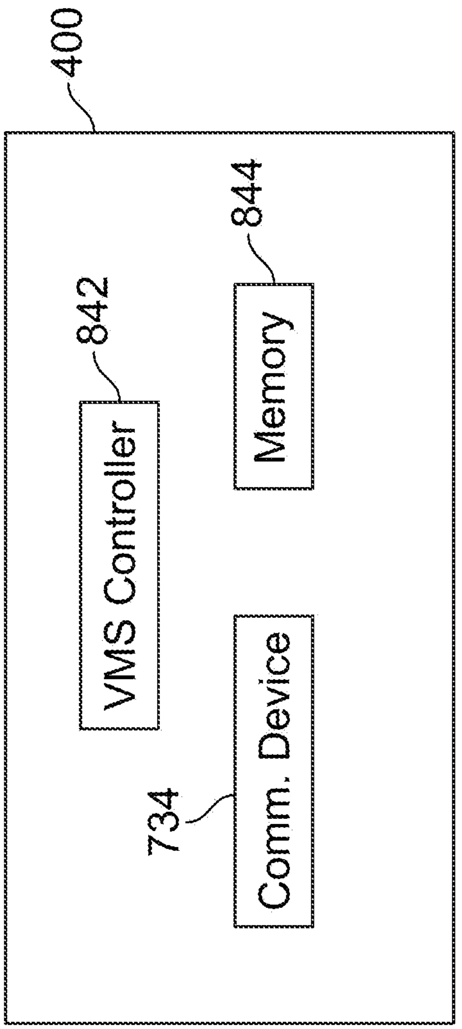
FIG. 8 illustrates one example of the monitoring system shown in FIG. 4.

FIG. 8 illustrates one example of the monitoring system 400. The monitoring system may be entirely disposed off-board the vehicle systems, may be onboard one or more vehicle systems, or may be partially onboard one or more vehicle systems and partially off-board one or more vehicle systems. The monitoring system includes a vehicle monitoring system controller 842 ("VMS Controller" in FIG. 8). This controller may represent hardware circuitry that includes and/or is connected with one or more processors that perform the operations described herein in connection with the monitoring system. For example, this controller may examine the movements of the vehicle systems, the portions of routes that are occupied by vehicle systems, etc., and determine movement authorities or other signals to send to the vehicles and/or vehicle systems to control and/or coordinate movements of the vehicles and/or vehicle systems to reduce or eliminate the likelihood of collisions or other unsafe movements. The monitoring system also may include another of the communication device described above, which can be used for communication with the vehicles and/or vehicle systems. The monitoring system may include a tangible and non-transitory computer readable memory, or a computer memory 844. This memory may store maps of the routes, layouts of the routes, locations of the boundaries of the mapped areas or monitored areas, locations of vehicles and/or vehicle systems, movements of vehicles and/or vehicle systems, sections of routes occupied by vehicles and/or vehicle systems, etc. The VMS controller can access this information in the memory to determine which movement authorities or other signals to send to the vehicles and/or vehicle systems.

Figure 9:
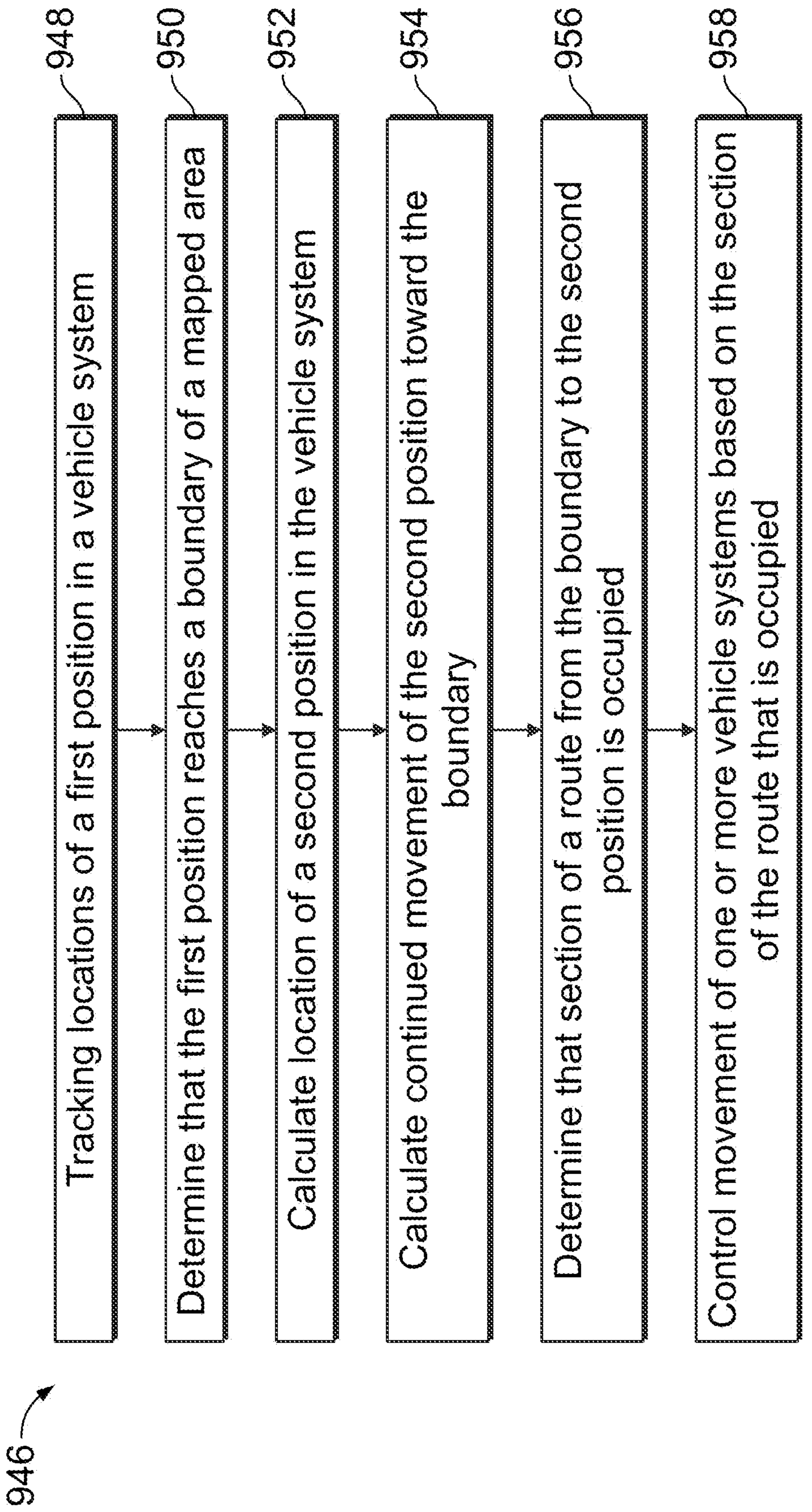
FIG. 9 illustrates a flowchart of one example of a method for monitoring and controlling movements of vehicle systems.

FIG. 9 illustrates a flowchart of one example of a method 946 for monitoring and controlling movements of vehicle systems. The method can represent operations performed by the monitoring system and/or vehicle system controller as described herein. At step 948, locations of a first position in a vehicle system are monitored. For example, a GNSS receiver may identify locations of a leading end or edge of a vehicle system as the vehicle system moves along a route. At step 950, the first position of the vehicle system is determined to reach a boundary of a mapped area (or monitored area) of a network of interconnected routes. At step 952, a location of a second position in the same vehicle system is calculated responsive to determining that the first position has reached the boundary. This second position may be a trailing or opposite end of the vehicle system. The location of the second position may be calculated using the length of the vehicle system or another distance along the route from the first position to the second position.

At step 954, movement of the second position in the vehicle system toward the boundary is calculated. For example, the moving speed of the vehicle system and the location of the second position may be used in a dead reckoning calculation to determine where the second position is located along the route toward the boundary. At step 956, the section of the route extending from the boundary toward the second position is identified or determined to be occupied by the vehicle system as the vehicle system moves toward the boundary and toward leaving the mapped area. At step 958, movement of one or more other vehicles and/or vehicle systems is controlled based on the section of the route that is occupied by the vehicle system leaving the mapped area.

In one embodiment, the controller(s) may have a local data collection system deployed that may use machine learning to enable derivation-based learning outcomes. The controller(s) may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller(s) may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller(s) can use this artificial intelligence or machine learning to receive inputs (e.g., a location of a trailing end of the vehicle system, a length of the vehicle system or other distance between the first and second positions of the vehicle system, the moving speed of the vehicle system, and/or the like), use a model that associates different combinations of these inputs with different segments of the route being occupied to select how much of the route is to be identified as being occupied, and then provide an output (e.g., the occupied segment of the route). The controller(s) may receive additional input of the occupied segment that was selected, operator input, or the like, which indicates whether the machine-selected occupied segment provided a desirable outcome or not. Based on this additional input, the controller can change the model, such as by changing which route segment would be selected as occupied when a similar or identical input combination is received the next time or iteration. The controller(s) can then use the changed or updated model again to select another occupied route segment, receive feedback on the selected occupied route segment, change or update the model again, etc., in additional iterations to repeatedly improve or change the model using artificial intelligence or machine learning.

In one example, a method is provided that includes monitoring a first location of a first position in a moving vehicle system, determining that the first location of the first position in the moving vehicle system has reached a designated location, calculating an initial location of a second position in the moving vehicle system responsive to the first location of the first position in the moving vehicle system reaching the designated location, and tracking movement of the second position in the moving vehicle system toward the designated location based on the initial location that is calculated and a moving speed of the vehicle system.

The method also may include communicating changes in second locations of the second position in the moving vehicle system toward the designated location to an off-board vehicle coordination system that may use the changes in the second locations of the second position in the moving vehicle system in managing movement of one or more other vehicle systems. The designated location may be a boundary of a mapped area. The first position in the moving vehicle system may be toward a leading end of the vehicle system and/or may be monitored using output from a position sensor disposed onboard the moving vehicle system. The second position in the moving vehicle system may not include a position sensor. The second position may be toward a trailing end of the vehicle system. Movement of the second position may be tracked using dead reckoning calculations.

In another example, a system is provided that includes a controller that may monitor a first location of a first position in a moving vehicle system and may determine that the first location of the first position in the moving vehicle system has reached a designated location and to calculate an initial location of a second position in the moving vehicle system responsive to the first location of the first position in the moving vehicle system reaching the designated location. The controller may track movement of the second position in the moving vehicle system toward the designated location based on the initial location that is calculated and a moving speed of the vehicle system.

The controller may communicate changes in second locations of the second position in the moving vehicle system toward the designated location to an off-board vehicle coordination system that may use the changes in the second locations of the second position in the moving vehicle system in managing movement of one or more other vehicle systems. The designated location may be at a boundary of a mapped area.

The first position in the moving vehicle system may be toward a leading end of the vehicle system. The controller may monitor the first location of the first position using output from a position sensor disposed onboard the moving vehicle system. The controller may not receive data indicative of the second position in the moving vehicle system from a position sensor. The second position in the moving vehicle system may be toward a trailing end of the vehicle system. The controller may track the movement of the second position using dead reckoning calculations.

In another example, a vehicle coordination system may include a controller disposed off-board a first vehicle system that may track movements of the first vehicle system and one or more other second vehicle systems within a network of interconnected routes. The controller may generate movement authorities to remotely restrict movements of the first and second vehicle systems based on the movements of the first and second vehicle systems. The controller may receive movements of a trailing end of the first vehicle system that is based on dead reckoning calculations of the trailing end initiated responsive to a leading end of the first vehicle system reaching a boundary of a mapped area.

The controller is configured to update one or more of the movement authorities based on the movements of the trailing end of the first vehicle system that are received. The controller may be unable to track the movements of the first and second vehicle systems outside of the mapped area. The controller may determine that the first vehicle system is occupying a shrinking segment of a first route of the routes that extends from the boundary of the mapped area to the trailing end of the first vehicle system.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such clauses are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:

monitoring a first location of a first position in a moving vehicle system;

determining that the first location of the first position in the moving vehicle system has reached a designated location on a route, wherein the designated location is a boundary of a mapped area monitored by a monitoring system;

calculating an initial location of a second position in the moving vehicle system responsive to the first location of the first position in the moving vehicle system reaching the designated location, wherein the second position is at a trailing end of the moving vehicle system, wherein calculating the initial location comprises calculating a distance along the route between the designated location and the initial location based on a length of the moving vehicle system;

tracking movement of the second position in the moving vehicle system toward the designated location based on the initial location that is calculated and a moving speed of the moving vehicle system; and controlling movement of the moving vehicle system based on a section of route occupied by a portion of the moving vehicle system, wherein the portion of the route occupied is between the designated location and the second position, wherein the section of the route extends from the boundary of the mapped area to the trailing end as the moving vehicle system leaves the mapped area.

2. The method of claim 1, further comprising communicating changes in second locations of the second position in the moving vehicle system toward the designated location to an off-board vehicle coordination system configured to use the changes in the second locations of the second position in the moving vehicle system in managing movement of one or more other vehicle systems.

3. The method of claim 1, wherein the first position in the moving vehicle system is toward a leading end of the moving vehicle system.

4. The method of claim 3, wherein the first location of the first position is monitored using output from a position sensor disposed onboard the moving vehicle system.

5. The method of claim 4, wherein the second position in the moving vehicle system does not include a position sensor.

6. The method of claim 5, wherein movement of the second position is tracked using dead reckoning calculations.

7. The method of claim 6, wherein the monitoring system is unable to track movements of the moving vehicle system outside of the mapped area.

8. The method of claim 6, wherein the section of the route is a shrinking segment.

9. The method of claim 1, further comprising determining a length of the moving vehicle system from the first position of the moving vehicle system to the second position of the moving vehicle system and wherein the length is based on at least one of lengths of individual vehicles in the moving vehicle system, number of the vehicles in the moving vehicle system, a distance between couplers between the vehicles in the moving vehicle system, or lengths of the couplers between the vehicles in the moving vehicle system.

10. The method of claim 1, comprising creating movement authorities for a second vehicle system to prevent the second vehicle system from occupying same section of the route as the moving vehicle system.

11. A system comprising:

a controller configured to monitor a first location of a first position in a moving vehicle system, the controller configured to determine that the first location of the first position in the moving vehicle system has reached a designated location on a route, wherein the designated location is a boundary of a mapped area monitored by a monitoring system, and the controller configured to calculate an initial location of a second position in the moving vehicle system responsive to the first location of the first position in the moving vehicle system reaching the designated location, wherein the second position is at a trailing end of the moving vehicle system, wherein calculating the initial location comprises calculating a distance along the route between the designated location and the initial location based on a length of the moving vehicle system, the controller configured to track movement of the second position in the moving vehicle system toward the designated location based on the initial location that is calculated and a moving speed of the moving vehicle system, the controller configured to control movement of the moving vehicle system based on a section of route occupied by a portion of the moving vehicle system, wherein the portion of the route occupied is between the designated location and the second position, wherein the section of the route extends from the boundary of the mapped area to the trailing end as the moving vehicle system leaves the mapped area.

12. The system of claim 11, wherein the controller is configured to communicate changes in second locations of the second position in the moving vehicle system toward the designated location to an off-board vehicle coordination system configured to use the changes in the second locations of the second position in the moving vehicle system in managing movement of one or more other vehicle systems.

13. The system of claim 11, wherein the first position in the moving vehicle system is toward a leading end of the moving vehicle system.

14. The system of claim 13, wherein the controller is configured to monitor the first location of the first position using output from a position sensor disposed onboard the moving vehicle system.

15. The system of claim 14, wherein the controller does not receive data indicative of the second position in the moving vehicle system from a position sensor.

16. The system of claim 15, wherein the controller is configured to track the movement of the second position using dead reckoning calculations.

17. The system of claim 11, wherein the controller is configured to determine a length of the moving vehicle system from the first position of the moving vehicle system to the second position of the moving vehicle system, wherein the second position is toward a trailing end of the moving vehicle system.

18. The system of claim 17, wherein the length is based on at least one of lengths of individual vehicles in the moving vehicle system, number of the vehicles in the moving vehicle system, a distance between couplers between the vehicles in the moving vehicle system, or lengths of the couplers between the vehicles in the moving vehicle system.

* * * * *